United States Patent
McGuire, Jr. et al.

(10) Patent No.: US 8,533,934 B2
(45) Date of Patent: Sep. 17, 2013

(54) METHOD OF ASSEMBLING A HARD DISK DRIVE

(75) Inventors: James E. McGuire, Jr., Westerville, OH (US); Andrew C. Strange, Worthington, OH (US)

(73) Assignee: entrotech, inc., Columbus, OH (US)

( * ) Notice: Subject to any disclaimer, the term of this patent is extended or adjusted under 35 U.S.C. 154(b) by 0 days.

(21) Appl. No.: 13/096,826

(22) Filed: Apr. 28, 2011

(65) Prior Publication Data

US 2012/0275054 A1    Nov. 1, 2012

(51) Int. Cl.
*G11B 5/127*    (2006.01)
*H04R 31/00*    (2006.01)

(52) U.S. Cl.
USPC ............. 29/603.03; 29/603.04; 29/603.06; 360/121; 360/122; 360/317

(58) Field of Classification Search
USPC ............ 29/603.03, 603.04, 603.06; 360/121, 360/122, 317
See application file for complete search history.

(56) References Cited

U.S. PATENT DOCUMENTS

| | | |
|---|---|---|
| 4,306,259 A | 12/1981 | Saito et al. |
| 4,367,503 A | 1/1983 | Treseder |
| 4,642,715 A | 2/1987 | Ende |
| 4,686,592 A | 8/1987 | Carroll et al. |
| 4,855,849 A | 8/1989 | Jones et al. |
| 4,965,691 A | 10/1990 | Iftikar et al. |
| 5,175,657 A | 12/1992 | Iftikar et al. |
| 5,214,550 A | 5/1993 | Chan |
| 5,233,491 A | 8/1993 | Kadonaga et al. |
| 5,235,481 A | 8/1993 | Kamo et al. |
| 5,243,495 A | 9/1993 | Read et al. |
| 5,247,410 A | 9/1993 | Ebihara et al. |
| 5,253,129 A | 10/1993 | Blackborow et al. |
| 5,270,887 A | 12/1993 | Edwards et al. |
| 5,317,463 A | 5/1994 | Lemke et al. |
| 5,454,157 A | 10/1995 | Ananth et al. |

(Continued)

FOREIGN PATENT DOCUMENTS

| | | |
|---|---|---|
| EP | 0 546 680 | 6/1993 |
| WO | WO 2005/117018 | 12/2005 |

OTHER PUBLICATIONS

"Donaldson Filtration Systems Adsorbent Label Filter (ALF): Disk Drive," Donaldson Company, Inc., Minneapolis, MN (Jul. 31, 2010).

(Continued)

*Primary Examiner* — Paul D Kim
(74) *Attorney, Agent, or Firm* — The Griffith Law Firm, A P.C.; Lisa M. Griffith

(57) ABSTRACT

A method of assembling a hard disk drive comprises steps of: sealing an interface of the base and the cover of an enclosed housing with an infrared-transmissive tape; filling the enclosed housing with a desired gaseous medium; optionally, testing the hard disk drive; and, optionally; re-working the hard disk drive. Preferably, the enclosed housing is free of rubber gasket materials between the base and the cover. A hermetically sealed hard disk drive of the invention comprises: a housing comprising a base and a cover; and disk drive components enclosed within the housing for facilitating reading and recording of data at any desired location on at least one disk contained within the housing, wherein the hard disk drive is free of rubber gasket materials between the base and the cover.

20 Claims, 2 Drawing Sheets

(56) References Cited

U.S. PATENT DOCUMENTS

| | | |
|---|---|---|
| 5,536,917 A | 7/1996 | Suppelsa et al. |
| 5,608,592 A | 3/1997 | Mizoshita et al. |
| 5,751,514 A | 5/1998 | Hyde et al. |
| 5,837,934 A | 11/1998 | Valavanis et al. |
| 5,880,904 A | 3/1999 | Mizoshita et al. |
| 5,898,537 A | 4/1999 | Oizumi et al. |
| 5,969,901 A | 10/1999 | Eckberg et al. |
| 6,008,965 A | 12/1999 | Izumi et al. |
| 6,023,392 A * | 2/2000 | Kim ............... 360/99.18 |
| 6,108,164 A | 8/2000 | Weber |
| 6,129,579 A | 10/2000 | Cox et al. |
| 6,168,459 B1 | 1/2001 | Cox et al. |
| 6,181,530 B1 | 1/2001 | Ratliff et al. |
| 6,226,143 B1 * | 5/2001 | Stefanksy ............... 360/99.2 |
| 6,236,532 B1 | 5/2001 | Yanagisawa |
| 6,317,286 B1 | 11/2001 | Murphy et al. |
| 6,392,838 B1 | 5/2002 | Hearn et al. |
| 6,430,000 B1 | 8/2002 | Rent |
| 6,442,021 B1 | 8/2002 | Bolognia et al. |
| 6,469,864 B2 | 10/2002 | Kamezawa et al. |
| 6,473,264 B2 | 10/2002 | Bae et al. |
| 6,480,353 B1 | 11/2002 | Sacks et al. |
| 6,525,899 B2 | 2/2003 | Hearn et al. |
| 6,560,064 B1 | 5/2003 | Hirano |
| 6,570,736 B2 | 5/2003 | Noda |
| 6,646,821 B2 | 11/2003 | Bernett et al. |
| 6,650,961 B2 | 11/2003 | Deckers |
| 6,678,112 B1 | 1/2004 | Kaneko |
| 6,693,767 B1 | 2/2004 | Butler |
| 6,762,909 B2 | 7/2004 | Albrecht et al. |
| 6,765,751 B2 | 7/2004 | Huang et al. |
| 6,785,082 B2 | 8/2004 | Fiorvanti et al. |
| 6,831,811 B1 | 12/2004 | Andrikowich et al. |
| 6,876,514 B1 | 4/2005 | Little |
| 6,934,118 B2 | 8/2005 | Hidaka et al. |
| 6,940,687 B2 | 9/2005 | Hong et al. |
| 7,082,012 B2 | 7/2006 | Macpherson et al. |
| 7,119,984 B2 | 10/2006 | Macleod et al. |
| 7,206,164 B2 | 4/2007 | Hofland et al. |
| 7,218,473 B2 | 5/2007 | Bernett et al. |
| 7,239,593 B2 | 7/2007 | Abe |
| 7,274,534 B1 | 9/2007 | Choy et al. |
| 7,300,500 B2 | 11/2007 | Okada et al. |
| 7,301,776 B1 | 11/2007 | Wang et al. |
| 7,315,447 B2 * | 1/2008 | Inoue et al. ............... 361/679.48 |
| 7,330,334 B2 | 2/2008 | Shimizu et al. |
| 7,362,541 B2 | 4/2008 | Bernett et al. |
| 7,414,813 B2 | 8/2008 | Huynh |
| 7,420,771 B1 | 9/2008 | Hanke et al. |
| 7,484,291 B1 | 2/2009 | Ostrander et al. |
| 7,508,622 B2 | 3/2009 | Martin et al. |
| 7,525,758 B2 | 4/2009 | Abe |
| 7,616,400 B2 | 11/2009 | Byun et al. |
| 7,630,169 B2 | 12/2009 | Murakami |
| 7,684,146 B1 | 3/2010 | Andrikowich et al. |
| 7,813,129 B2 | 10/2010 | Van Der Werff |
| 8,014,167 B2 * | 9/2011 | Gunderson et al. ............ 361/800 |
| 8,018,687 B1 | 9/2011 | Little et al. |
| 2001/0042301 A1 | 11/2001 | Khuu |
| 2002/0149885 A1 | 10/2002 | Dague et al. |
| 2002/0196580 A1 | 12/2002 | Tsukahara et al. |
| 2003/0081349 A1 | 5/2003 | Bernett |
| 2003/0089417 A1 | 5/2003 | Bernett |
| 2003/0179488 A1 | 9/2003 | Kant et al. |
| 2003/0179489 A1 | 9/2003 | Bernett et al. |
| 2003/0223148 A1 | 12/2003 | Macleod et al. |
| 2004/0150909 A1 | 8/2004 | Kimura |
| 2004/0184184 A1 | 9/2004 | Komatsu et al. |
| 2004/0207980 A1 | 10/2004 | Kobayashi |
| 2005/0013039 A1 | 1/2005 | Matsumura et al. |
| 2005/0094312 A1 | 5/2005 | Sato |
| 2005/0130457 A1 | 6/2005 | Nozaki et al. |
| 2006/0050429 A1 | 3/2006 | Gunderson et al. |
| 2007/0171567 A1 | 7/2007 | Choi et al. |
| 2008/0174910 A1 | 7/2008 | Hirono et al. |
| 2008/0212237 A1 | 9/2008 | Uefune et al. |
| 2008/0226534 A1 | 9/2008 | Gidumal et al. |
| 2009/0073328 A1 | 3/2009 | Gunderson et al. |
| 2009/0073842 A1 | 3/2009 | Kim |
| 2009/0116141 A1 | 5/2009 | Brown |
| 2009/0183475 A1 | 7/2009 | Dauber et al. |
| 2011/0212281 A1 | 9/2011 | Jacoby et al. |
| 2012/0275052 A1 | 11/2012 | McGuire |
| 2012/0275053 A1 | 11/2012 | McGuire |
| 2012/0275055 A1 | 11/2012 | McGuire |
| 2012/0275056 A1 | 11/2012 | McGuire |
| 2012/0275057 A1 | 11/2012 | McGuire |
| 2012/0275105 A1 | 11/2012 | McGuire |
| 2012/0275106 A1 | 11/2012 | McGuire |
| 2012/0275285 A1 | 11/2012 | McGuire |
| 2012/0275286 A1 | 11/2012 | McGuire |
| 2012/0275287 A1 | 11/2012 | McGuire |

OTHER PUBLICATIONS

"Donaldson Filtration Systems Adsorbent Pouch Filter (APF): Disk Drive," Donaldson Company, Inc., Minneapolis, MN (Jul. 31, 2010).
"Infrared," http://en.wikipedia.org/wiki/Infrared (Feb. 14, 2011).
"Laser Makes Invisible Welds in Plastics," Connect, No. 100; http://www.twi.co.uk/content/c1008b.html (May 31, 1999).
"Laser Welding of Plastics (Knowledge Summary)," http://www.twi.co.uk/content/ksab002.html (Dec. 31, 2009).
"Nd:YAG laser," http://en.wikipedia.org/wiki/Nd:YAG_laser (Feb. 14, 2011).
Jones, Ian, "Clearweld (Knowledge Summary)," http://www.twi.co.uk/content/ksiaj001.html (Dec. 31, 2010).
Venkat, Sri et al., "Sealing Plastic Seams With Laser Welding," www.devicelink.com/mddi (May 31, 2008).
Warwick, Marcus et al., "Application Studies Using Through-Transmission Laser Welding of Polymers," http://www.twi.co.uk/content/spcmwapr2006.html (Apr. 25, 2006).

* cited by examiner

METHOD OF ASSEMBLING A HARD DISK DRIVE

BACKGROUND OF THE INVENTION

The present invention relates generally to temporary sealing of hermetic hard disk drives.

A disk drive is a device used to store information in a computing environment. In a disk drive, data is generally recorded on planar, round, rotating surfaces (which are commonly referred to as disks, discs, or platters). There are several types of disk drives, including optical disk drives, floppy disk drives, and hard disk drives. Nowadays, hard disk drives tend to be most common. Strictly speaking, "drive" refers to a device distinct from its medium, such as a tape drive and its tape, or a floppy disk drive and its floppy disk. A hard disk drive (sometimes referred to as a HDD), also referred to as a hard drive, hard disk, or fixed disk drive, is a non-volatile storage device that stores digitally encoded data on rapidly rotating platters with magnetic surfaces. Early hard disk drives had removable media; however, a HDD today is typically an encased unit with fixed media.

A typical hard disk drive includes a head disk assembly (HDA) and a printed circuit board assembly (PCBA) attached to a disk drive base of the HDA. The HDA typically includes at least one magnetic disk, a spindle motor for rotating the disk, and a head stack assembly (HSA) having an actuator assembly with at least one transducer head, typically several, for reading and writing data from the disk. The PCBA includes a servo control system in the form of a disk controller for generating servo control signals. The HSA is controllably positioned in response to the generated servo control signals from the disk controller. In so doing, the attached heads are moved relative to tracks disposed upon the disk. The heads are typically distanced from the magnetic disk by a gaseous cushion—so that they are said to "fly" over the disk. Thus, it is important that the position of the heads be well-controlled for proper reading and writing from the disk.

Hard disk drives are generally sealed to prevent dust and other external sources of contamination from interfering with operation of the hard disk heads therein. Some hard disk drives are hermetically sealed. A hermetic seal is generally understood to be an airtight seal. Note that some seals (e.g., those "sealing" air within the hard disk drive) are not literally air tight, but rather utilize an extremely fine air filter in conjunction with air circulation inside the hard drive enclosure. The spinning of the disks causes air to circulate therein, forcing any particulates to become trapped on the filter. The same air currents also act as a gas bearing, which enables the heads to float on a cushion of air above the surfaces of the disks. However, "hermetically" sealed means that the seal is so airtight that the disk drive's internal pressure is substantially independent of the external or ambient pressure. This is in contrast to a conventional or non-hermetically sealed disk drive that has a breather port with a filter in a wall of the base plate or cover for equalizing the disk drive's internal pressure with the external pressure. Thus, a hermetically sealed drive does not contain a breather port.

Within a hermetically sealed hard disk drive, gases other than atmospheric air are often employed. Filling the sealed environment of a hard disk drive with gases other than air can enhance their performance. For example, use of lower density inert gases, such as helium, can reduce aerodynamic drag between the disks and their associated read/write heads by a factor of approximately five-to-one as compared to their operation in air. This reduced drag beneficially results in reduced power requirements for the spindle motor. A helium-filled drive, thus, uses substantially less power than a comparable hard disk drive operating in an air environment. At the same time, the helium gas also conducts heat generated during operation of the disk drive away more effectively than air.

Hermetically sealed hard disk drives are first filled with a desired gaseous medium (whether it be atmospheric air or one or more other gases) before operation. Then, if the constituency of the gaseous medium substantially changes due to leakage of the hard disk drive housing, the hard disk drive must be either discarded or refilled with the desired gaseous medium. Filling disk drives to a desired pressure and concentration of gaseous components, however, can be both time-consuming and difficult. A number of patent documents focus on providing and/or replenishing gases such as helium at a desired concentration within a hard disk drive. See, for example, U.S. Patent Publication Nos. 2003/0081349 and 2003/0089417. Also see U.S. Pat. No. 6,560,064.

Due to imperfect sealing of hard disk drive housings, the benefits of using lower density gases such as helium are conventionally not longstanding. Potential paths of leakage (allowing both air flow into the hard disk drive housing and allowing gas outflow from the hard disk drive housing) include those paths existing at the junction of two mating components thereof. Those components include, for example, screws or other mechanical fasteners used to conventionally fasten multiple parts of the housing together. In addition, gasket seals and the like used to improve the seal between multiple components are often susceptible to at least some leakage. As gas such as helium leaks out of a sealed hard disk drive, air leaks in (or vice versa), causing undesirable effects in the operation of the disk drives—even possibly causing the disk drives to catastrophically fail. For example, an increased concentration of air inside the hard disk drive may increase forces on the read/write head therein due to turbulent airflow within the drive. Further, such undesired air may cause the read/write heads to "fly" at too great a distance above the disks. The risk of unexpected failure due to inadequate concentration of helium within such drives is a considerable drawback to helium-filled disk drives, particularly since the data stored within the disk drive can be irretrievably lost if the disk drive fails.

Therefore, as discussed in U.S. Patent Publication No. 2003/0179489, despite the advantages of helium-filled drives, such drives have not been commercially successful. This is mainly due to problems associated with leakage of gas from within the drives over time. Unlike air-filled disk drives, helium-filled drives do not include a filtered port to equalize the pressure within the drive to the ambient pressure—which ensuing pressure differential contributes to increased leakage of gas. Thus, while prior art helium drives are completely "sealed" in the conventional sense, it is still possible for helium gas therein to leak out past conventional rubber gasket seals used to seal the top cover to the drive base. Such leakage is not surprising given the relatively smaller size (i.e., lower atomic weight) of the helium atoms in comparison to the constituent gases found in air (i.e., nitrogen and oxygen). That is, the rubber gasket seals on prior art drives allow the relatively smaller helium atoms to diffuse through the rubber membrane. Indeed, such prior art gasket seals do not provide hermetic seals with respect to air (i.e., the gasket seals are also permeable to the larger atoms of nitrogen and oxygen in air) since it is air that typically displaces the helium gas that leaks from the drive.

Most prior art gasket seals are only intended to keep relatively large contaminants such as dust or smoke from the interior of a disk drive. However, such gasket seals have been preferred as compared to other, more permanent methods of sealing a drive for two main reasons. First, such seals typically do not outgas and, thus, do not contribute to the contamination of the interior of the drive. Secondly, such seals may be reused if necessary during the assembly of the disk drive, such as when an assembled drive fails to pass certification testing and must be "re-worked." Re-working a drive typically entails removing the top cover from the base and replacing a defective disk or read/write head while the drive is still in a clean room environment. The re-worked drive is then reassembled, which can even be done using the same rubber gasket seal positioned between the base and the top cover. Unfortunately, however, while such gasket seals are convenient, they are expensive and simply often do not provide a sufficient hermetic seal to maintain the required concentration of helium (or other low density gas) within the disk drive for the desired service life of the drive.

In view of the potential for long-term performance problems, U.S. Patent Publication No. 2003/0179489 describes a disk drive assembly having a sealed housing. As described therein, a disc drive includes a base plate supporting a spindle motor and an actuator assembly. A structural cover is removably attached to the base plate to form an internal environment within the disc drive. The internal environment of the drive is filled with a low density gas such as helium, and a sealing cover is permanently attached to the base plate and the structural cover to form a hermetic seal that maintains a predetermined concentration of the low density gas within the internal environment over a service lifetime of the disc drive.

The disc drive further includes a first seal secured between the base plate and the structural cover to prevent contaminants from entering the internal environment of the disc drive. The first seal is formed from a material such as rubber that allows leakage of the low density gas from the internal environment at a sufficiently low rate so that the disc drive may be operated for a predetermined period of time in the absence of the sealing cover.

In one embodiment, the base plate includes a raised outer edge and the sealing cover includes a downward depending edge that is adhesively bonded within a groove formed between an outer surface of the structural cover and the raised outer edge of the base plate. Alternatively, the sealing cover may include a downward depending edge that is adhesively secured to an outer perimeter wall of the base plate. In an alternative embodiment, the sealing cover is soldered to a top surface of the raised outer edge of the base plate. Such assemblies purportedly create a hermetic seal that will maintain desired concentrations of helium (or other low density gases) within the drive over the operational lifespan of the drive (e.g., leaking helium at such a low rate that it would take over seventy years for the helium concentration to drop below a predetermined lower limit). However, such sealing covers are not without their limitations—e.g., those dimensional limitations discussed in U.S. Patent Publication No. 2003/0179489 and the potential interference of such sealing covers with electrical connectors, such as those associated with flex circuitry protruding from the disk drive. Thus, improvements are still needed.

In addition, while U.S. Patent Publication No. 2003/0223148 (corresponding to U.S. Pat. No. 7,119,984) discusses improved containment of helium within a hard disk drive, the methods therein rely on laser-based metal sealing of such drives. Further, such "sealing" of drives is incomplete in that it does not prevent leakage through valves and ports used to inject gas into disk drive housings once sealed as such. As described therein, a base can be combined with a cover by overlapping respectively corresponding coupling flanges of the base and cover with each other. The coupling flanges are then described as being jointed and fastened together by spot welding, but only if both of the base and cover are made of metal including iron. Alternatively, hermetic sealing to some extent is said to be guaranteed if seam-welding is effected by continuously carrying out spot welding. Alternatively, when the base and the cover are made of a metal other than iron or a resin material, the coupling flanges are described as being joined together by means such as wrap-seaming, screws, or riveting. Still further, if both the base and cover are made of metal including aluminum or made of a resin material, the coupling flanges are stated to be preferably jointed and fastened together by screws or rivets. Further, in the outer peripheral portion of the jointed coupling flanges, a frame composed of a pair of L-shaped frame elements can be attached to force the jointed coupling flanges to be closed up tightly. Each of these L-shaped frame elements are made of so-called engineering plastic, e.g., polyamide resin or polyphenylene sulfide resin, and have a sectional form with a recess corresponding to the outer shape of the jointed coupling flanges. In this case, the L-shaped frame elements are fixed to the jointed coupling flanges of the housing by adhesive or by welding the frame elements per se. Also see U.S. Pat. No. 6,762,909 for a description of laser welding of a disk drive's cover and base plate made of aluminum or other alloys. Similarly, U.S. Pat. No. 5,608,592 discusses how spot welding can be used to secure a base and cover of a disk drive housing.

U.S. Pat. No. 4,686,592 discloses a housing comprising a lower body portion and a cover portion. Lower body portion is stated to be cylindrical in shape, having a lip located towards the outer periphery and a ledge associated therewith. Cover portion is stated to have a lip portion along its outer periphery. The inner and outer diameter of the lips are selected so that the two lips nest with one another when the cover portion is placed over the lower body portion, i.e., the outer diameter of the lower body portion's lip is selected to be greater than the inner diameter of the cover portion's lip. Further, the height of the cover portion's lip is selected with respect to the height of the lower body portion's lip so that a groove is formed for accommodating the outer periphery of the disk. Adhesives, such as epoxy, can be applied in the groove to assist in fixedly securing the disk within the groove. The disk is further secured in the groove by the clamping action provided by the cover portion and the lower body portion. Alternative methods for securing the cover portion to the lower body portion described therein include: threading, cam-locking, radial crimping, laser welding, ultrasonic welding, and the like.

U.S. Pat. Nos. 6,392,838 and 6,525,899 disclose a disk drive assembly purportedly hermetically encased within a metallic can. The metallic can comprises a top and bottom housing. Each housing component includes a sealing flange extending around its periphery. After the disk drive assembly is securely placed into the bottom housing, the top and bottom housings are mated and sealed together by forming a seam seal with the seal flanges. Also disclosed is use of a metallic gasket seal having a C-shaped cross-sectional area to purportedly hermetically seal a disk drive assembly. The C-seal includes a base layer and a plating layer, with the length of the seal extending the periphery of the disk drive base, similar to conventional elastomer gasket seals. After the disk drive cover is placed over the disk drive base and C-seal, the cover is clamped, thus compressing the C-seal. The resulting compression forces the plating layer to fill surface asperities in the area of the disk drive cover and base that contact the C-seal. These configurations purportedly provide assemblies with atmosphere leak rates of less than one cubic centimeter per $10^8$ seconds or 5% of the volume of the sealed atmosphere over ten years.

In view of the number of potential problems impacting effective and long-term performance of hard disk drives, alternative methods and apparatus for providing improved hermetically sealed hard disk drives are desired. Most desired are those methods and apparatus with improved efficiency and reliability over conventional attempts to provide the same.

SUMMARY OF THE INVENTION

A method of assembling a hard disk drive comprises steps of: providing a base component of a housing of the hard disk drive; providing a cover component of the housing; mating the base component and the cover component to form an enclosed housing that encloses disk drive components for facilitating reading and recording of data at any desired location on at least one disk contained within the enclosed housing; sealing an interface of the base and the cover of the enclosed housing with an infrared-transmissive tape; filling the enclosed housing with a desired gaseous medium; optionally, testing the hard disk drive; and, optionally; re-working the hard disk drive. Preferably, the enclosed housing is free of rubber gasket materials between the base and the cover.

According to one embodiment of the method, the infrared-transmissive tape remains on the hard disk drive during the optional step of re-working the hard disk drive. According to a further embodiment of the method, the method further comprises the steps of: after re-working the hard disk drive, reforming and resealing the enclosed housing with another infrared-transmissive tape; and re-testing the hard disk drive after re-working the hard disk drive.

According to yet a further embodiment of the method, the method further comprises a step of irreversibly hermetically sealing the hard disk drive. An exemplary step of irreversibly hermetically sealing the hard disk drive comprises using through transmission infrared bonding to mechanically couple the base and the cover. For increased process efficiency, the infrared-transmissive tape remains on the hard disk drive during the step of irreversibly hermetically sealing the hard disk drive according to one embodiment.

According to one embodiment of the method, at least one of the base and the cover comprises plastic. In another embodiment, each of the base and the cover comprises plastic. Exemplary plastics comprise polycarbonate and polybutylterepthalate.

According to one embodiment of the method, the step of mating the base component and the cover component to enclose disk drive components results in a portion of the enclosed housing comprising an overlap of the base and the cover. For further advantages, an outer of the base and the cover in the overlap is infrared-transmissive according to this aspect of the method of the invention. A further step of irreversibly hermetically sealing the hard disk drive according to this aspect of the method of the invention comprises using through transmission infrared bonding to mechanically couple the base and the cover at the overlap.

According to one embodiment of the method, the infrared-transmissive tape is adhered to the enclosed housing so that it covers a seam formed by mating of the cover and the base. The infrared-transmissive tape may be adhered to the enclosed housing in a single piece or in multiple pieces. More than one infrared-transmissive tape may be adhered to the enclosed housing.

A hermetically sealed hard disk drive of the invention comprises: a housing comprising a base and a cover; and disk drive components enclosed within the housing for facilitating reading and recording of data at any desired location on at least one disk contained within the housing, wherein the hard disk drive is free of rubber gasket materials between the base and the cover. According to a further embodiment, the hard disk drive comprises an infrared-transmissive sealing tape on an exterior surface of the housing over an interface of the base and the cover. In an exemplary embodiment, at least one of the base and the cover comprises plastic.

BRIEF DESCRIPTION OF THE DRAWINGS

Note that the components and features illustrated in all figures throughout this application are not necessarily drawn to scale and are understood to be variable in relative size and placement. Similarly, orientation of many of the components and features within the figures can vary such that, for example, a horizontal configuration could be readily reoriented to a vertical configuration, and vice versa, as desired.

DETAILED DESCRIPTION OF THE PREFERRED EMBODIMENTS OF THE INVENTION

A disk drive assembly conventionally includes a base to which various components of the disk drive are mounted. A top cover cooperates with the base to form a housing that defines an encased environment for the disk drive. Any disk drive comprises any of a number of suitable components encased within the housing. The components within the disk drive include, for example, a spindle motor, which rotates one or more magnetic disks at a constant high speed, and an actuator assembly for writing information to and reading information from circular tracks on the disks. The actuator assembly typically includes a plurality of actuator arms extending towards the disks, with one or more flexures extending from each of the actuator arms. Mounted at the distal end of each of the flexures is a read/write head, which includes an air bearing slider enabling the head to fly in close proximity above the corresponding surface of the associated disk during operation of the disk drive. When the disk drive is powered down, the heads may be moved to a landing zone at an innermost region of the disks where the air bearing sliders are allowed to land on the disk surface as the disks stop rotating. Alternatively, the actuator assembly may move (unload) the heads beyond the outer circumference of the disks so that the heads are supported away from the disk surface by a load/unload ramp when the drive is powered down.

Figure 1:
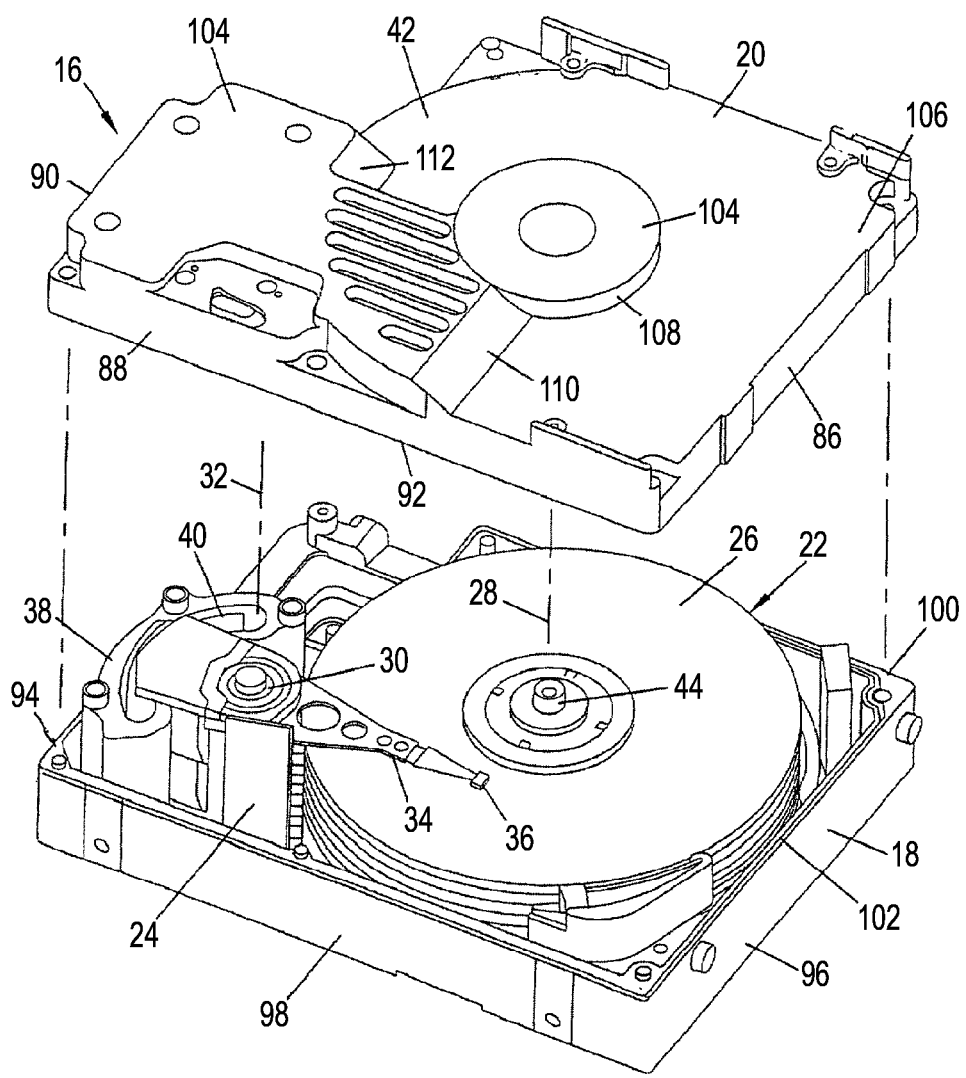
FIG. 1 is a partial perspective view of a prior art hard disk drive with the top cover of the drive housing removed to illustrate certain features.

Turning now to the drawings, there is shown in FIG. 1 part of a prior art hard disk drive 16 described in U.S. Patent Publication No. 2003/0223148. The prior art hard disk drive 16 illustrated in FIG. 1 is only one example of many well-known embodiments of hard disk drives and is illustrated to show exemplary components of hard disk drives for use as a reference in conjunction with a description of the present invention. Recognize, however, that many conventional hard disk drives can be modified according to the improvements of the invention.

As shown in FIG. 1, a conventional hard disk drive 16 has a rigid outer housing including a base 18 and a cover 20. In FIG. 1, the cover 20 is removed from the base 18 to reveal a disk pack or spindle assembly 22 and a rotary actuator 24, both of which are mounted moveably with respect to the housing formed by the base 18 and cover 20. More particularly, the spindle assembly 22 includes a top disk 26 and several additional concentrically stacked and spaced-apart disks rotatable about a vertical spindle axis 28.

Rotary actuator 24 includes an actuator shaft 30 mounted to pivot relative to the base 18 about a vertical actuator axis 32. Several transducer support arms, including a top support arm 34, are fixed to rotate with the actuator shaft 30. Each arm carries a magnetic data transducing head—e.g., a transducing head 36 on a support arm 34. The rotary actuator 24 pivots to move the transducing head 36 along arcuate paths generally radially with respect to the disks. Selective actuator 24 pivoting, in combination with controlled rotation of the disks, allows reading and recording of data at any desired location at any one of the disk recording surfaces. Rotary actuator 24 is pivoted by selective application of an electrical current to a voice coil 38 supported for arcuate movement within a magnetic field created by a permanent magnet arrangement 40, which includes several magnets and a poll piece (both of which are not illustrated in further detail).

The rotary actuator 24 and spindle assembly 22 are supported between two opposed housing walls, including a top wall 42 of the cover 20 and a bottom wall of the base 18. Spindle shaft 44 and the actuator shaft 30 may be stationary— meaning that they are integral with the housing—with the disks and support arms being mounted to rotate relative to their respective shafts.

The cover 20 includes a vertical continuous sidewall structure including a rearward wall 86, a sidewall 88, and a forward wall 90. Here, the upper sidewall structure includes a generally flat, horizontal continuous bottom edge 92, though some embodiments may include a flange or other mated fitting so as to fit into a top edge 100 of base 18 facilitating a tight fit and/or laser-welding. The base 18 includes an upright wall structure including a forward wall 94, a rearward wall 96, and two opposed sidewalls, one of which is shown at 98. These walls combine to form a continuous, horizontal top edge 100. FIG. 1 also illustrates an elastomeric gasket seal 102 mounted to top edge 100 of the base 18. When the cover 20 is assembled onto the base 18, the confronting bottom edge 92 of the cover 20 and the top edge 100 of the base 18 are brought into sealing engagement to close the housing about the spindle assembly 22 and the rotary actuator 24.

The upper and lower sidewalls 88, 98 are generally relatively thick to lend rigidity to the housing. The top wall 42 of the cover 20 may be formed with a horizontal full height region 104 and a horizontal recessed region 106, the two types of regions being interconnected by several non-horizontal regions as indicated at 108, 110 and 112. One portion of the full height region 104 accommodates the rotary actuator 24 and the spindle assembly 22. The non-horizontal regions 108, 110, 112 provide additional stiffness to the top wall 42 of the cover 20, which strengthens the top wall 42 and enables a somewhat reduced thickness wall construction.

During exemplary manufacture and assembly of a hard disk drive according to the invention, a base and a cover are provided and enclosed around components internal to the hard disk drive within a clean room environment. When an electrical connector is also to be assembled such that it protrudes external to the housing, it is likewise assembled within the clean room environment. Any suitable mechanism can be used to mechanically couple components (e.g., a base and cover) of the hard disk drive housing.

In an exemplary embodiment, at least one of the two components of the hard disk drive housing consists essentially of an infrared-transmissive material. In a further embodiment, each of the two components of the hard disk drive housing consists essentially of an infrared-transmissive material. A preferred infrared-transmissive material is plastic. Suitable plastic materials include, for example, polycarbonate and polybutylterepthalate.

Use of plastic affords many advantages. The lighter weight provided by such materials as opposed to conventional metallic housing materials translates into lighter weight assemblies including the hard disk drive, which makes for not only often more desirable features for the user of such assemblies but also beneficially reduces manufacturing and shipping costs associated with such assemblies.

Figure 2:
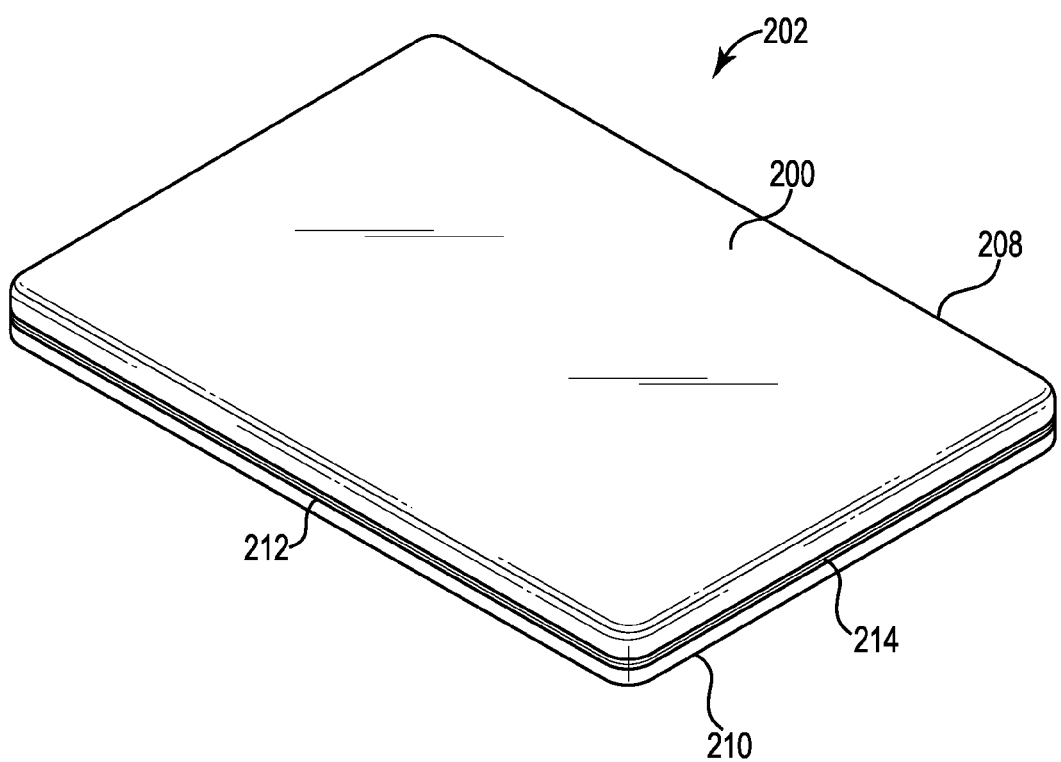
FIG. 2 is a top perspective view of a hard disk drive comprising a temporary hermetic seal according to the invention.

As illustrated in FIG. 2, after the base 208 and the cover 210 are enclosed around internal components to the hard disk drive 200, a temporary sealing tape 212 is used to seal the interface between the cover 210 and the base 208 according to the invention. The temporary sealing tape 212 is adhered to the enclosed housing so that it covers the seam 214 formed by mating of the cover 210 and the base 208. The temporary sealing tape 212 may be adhered to the enclosed housing in a single or multiple pieces. Each of the one or more pieces of temporary sealing tape 212 may be the same or different. That is, more than one temporary sealing tape 212 may be adhered to the enclosed housing.

Use of temporary sealing tapes 212 according to the invention provides advantages over conventional sealing materials used to temporarily seal hard disk drives for testing. Advantages include, for example, increased processing efficiency and decreased manufacturing costs. In order to adequately seal the gaseous medium within the hard disk drive 200 during testing of the hard disk drive 200, use of expensive gasket seals is not necessary according to preferred embodiments of the invention. While such gasket seals may be used, if desired, their use would generally be redundant and inefficient.

Any suitable adhesive tape can be used for the temporary sealing tape 212. Unlike conventional temporary sealing tapes used in the disk drive industry, however, exemplary temporary sealing tapes 212 according to preferred embodiments of the invention do not include metallic or other components that block transmission of infrared radiation. That is, preferably the temporary sealing tape 212 is infrared-transmissive so that the housing can be permanently sealed efficiently after application of the temporary sealing tape 212 and testing of the hard disk drive 200. For example, the housing can be permanently sealed using through transmission infrared bonding without removal of the temporary sealing tape 212 after successful testing of the hard disk drive 200 when the tape 212 is infrared-transmissive. Such bonding is described in co-pending U.S. patent application Ser. No. 61/480,243, entitled "Disk Drives Sealed Using Low Thermal Energy Bonding," which is incorporated herein by reference in its entirety.

An exemplary temporary sealing tape 212, available from entrotech, inc. of Columbus, Ohio under the trade designation entrofilm 575, was found to provide adequate sealing of the hard disk drive 200 on a temporary basis during testing thereof. Further, potential for contamination of the hard disk drive 200 from adhesive residue is minimized due to balance of adhesion properties in such a tape 212. For example, the adhesive layer in such a tape 212 is anchored to its backing at a greater strength than its anchorage to the surface on the hard disk drive 200 on which it is used. Thus, if the temporary sealing tape 212 must be removed from the hard disk drive 200 during testing and re-working of the drive 200, risk of adhesive contamination is minimized as the tape 212 can be easily peeled cleanly away from the hard disk drive 200 instead of necessitating cutting therethrough to separate the housing components when re-working the drive 200.

While the temporary sealing tape 212 is preferably removed from the hard disk drive 200 for re-working of the hard disk drive 200, the tape 212 may instead remain on the hard disk drive 200 and be severed to open the housing. In that case, another temporary sealing tape may be used to reseal the hard disk drive 200 for further testing after re-working the drive 200.

In one embodiment of a method of assembling and testing a hard disk drive 200, the base 208 and the cover 210 are enclosed around internal components to the hard disk drive 200 in an environment filled with the desired gaseous medium (when the desired medium is other than atmospheric air). The temporary sealing tape 214 is then adhered thereto. In another embodiment, after enclosing the base 208 and the cover 210 around internal components to the hard disk drive 200 and adhering the temporary sealing tape 214 thereto, the hard disk drive 200 is evacuated and filled with the desired gaseous medium (when the desired medium is other than atmospheric air). A fill port or other conventional methodology can be used for filling the hard disk drive 200 with the desired gaseous medium according to this embodiment.

The hard disk drive 200 then preferably undergoes routine testing and re-working, if necessary. Once the hard disk drive 200 passes such testing, the hard disk drive 200 is more permanently hermetically sealed using any suitable method. The temporary sealing tape 212 need not be removed after testing and, if necessary, re-working of the hard disk drive. Thus, process efficiency is enhanced by leaving the temporary sealing tape 212 on the hard disk drive 200 after steps of testing and re-working.

Advantages associated with hard disk drives and related methods of the present invention include improved process efficiency and improved containment of a gaseous medium within an enclosed hard disk drive. Within the sealed environment of hard disk drives of the invention, a gas having a density less than that of atmospheric air can be effectively employed. For example, a gaseous medium comprising at least one of nitrogen, helium, or other noble gases can be employed therein, alone or in combination with one or more of each other and/or air.

In an exemplary embodiment, an improved hard disk drive of the invention is capable of providing and maintaining an adequate sealed environment for at least five years. An adequate sealed environment is one in which hard disk drive performance is not significantly affected due to leakage. According to one embodiment, at least about 90% by volume, preferably at least about 95% by volume, of a gaseous medium originally contained within a hard disk drive remains after five years. Any suitable methodology can be used to detect leakage of a gaseous medium from a hard disk drive and amounts thereof.

Various modifications and alterations of the invention will become apparent to those skilled in the art without departing from the spirit and scope of the invention, which is defined by the accompanying claims. It should be noted that steps recited in any method claims below do not necessarily need to be performed in the order that they are recited. Those of ordinary skill in the art will recognize variations in performing the steps from the order in which they are recited. Further, while the present invention has been described with respect to a hard disk drive, it should be understood that the present invention also finds utility in other data storage devices—e.g., optical and magneto-optical storage devices.

The invention claimed is:

1. A method of assembling a hard disk drive, the method comprising steps of:
   providing a base component of a housing of the hard disk drive;
   providing a cover component of the housing;
   mating the base component and the cover component to form an enclosed housing that encloses disk drive components for facilitating reading and recording of data at any desired location on at least one disk contained within the enclosed housing;
   sealing an interface of the base component and the cover component of the enclosed housing with an infrared-transmissive adhesive tape;
   filling the enclosed housing with a desired gaseous medium;
   optionally, testing the hard disk drive; and
   optionally, re-working the hard disk drive.

2. The method of claim 1, further comprising a step of irreversibly hermetically sealing the hard disk drive.

3. The method of claim 2, wherein the step of irreversibly hermetically sealing the hard disk drive comprises using through transmission infrared bonding to mechanically couple the base component and the cover component.

4. The method of claim 1, wherein the infrared-transmissive adhesive tape remains on the hard disk drive during the step of irreversibly hermetically sealing the hard disk drive.

5. The method of claim 1, wherein at least one of the base component and the cover component comprises plastic.

6. The method of claim 5, wherein the plastic is polycarbonate or polybutylterepthalate.

7. The method of claim 1, wherein each of the base component and the cover component comprises plastic.

8. The method of claim 1, wherein the step of mating the base component and the cover component to enclose disk drive components results in a portion of the enclosed housing comprising an overlap of the base component and the cover component.

9. The method of claim 8, wherein an outer of the base component and the cover component in the overlap is infrared-transmissive.

10. The method of claim 9, further comprising a step of irreversibly hermetically sealing the hard disk drive, wherein the step of irreversibly hermetically sealing the hard disk drive comprises using through transmission infrared bonding to mechanically couple the base component and the cover component at the overlap.

11. The method of claim 1, wherein the enclosed housing is free of rubber gasket materials between the base component and the cover component.

12. The method of claim 1, wherein the infrared-transmissive adhesive tape is adhered to the enclosed housing so that the infrared-transmissive adhesive tape covers a seam formed by mating of the cover component and the base component.

13. The method of claim 1, wherein the infrared-transmissive adhesive tape is adhered to the enclosed housing in a single piece.

14. The method of claim 1, wherein the infrared-transmissive adhesive tape is adhered to the enclosed housing in multiple pieces.

15. The method of claim 1, wherein more than one infrared-transmissive adhesive tape is adhered to the enclosed housing.

16. The method of claim 1, wherein the infrared-transmissive adhesive tape remains on the hard disk drive during the optional step of re-working the hard disk drive.

17. The method of claim 1, further comprising the steps of:
after re-working the hard disk drive, reforming and resealing the enclosed housing with another infrared-transmissive adhesive tape; and
re-testing the hard disk drive after re-working the hard disk drive.

18. The method of claim 1, wherein the infrared-transmissive adhesive tape comprises a backing and an adhesive layer and wherein the adhesive layer in the infrared-transmissive adhesive tape is anchored to the backing in the infrared-transmissive adhesive tape at a greater strength than it is anchored to a surface on the hard disk drive on which the infrared-transmissive adhesive tape is used.

19. The method of claim 1, wherein the infrared-transmissive adhesive tape is free of metallic or other components that block transmission of infrared radiation.

20. A method of assembling a hard disk drive, the method comprising steps of:
providing a base component of a housing of the hard disk drive;
providing a cover component of the housing;
mating the base component and the cover component to form an enclosed housing that encloses disk drive components for facilitating reading and recording of data at any desired location on at least one disk contained within the enclosed housing;
sealing an interface of the base component and the cover component of the enclosed housing with an infrared-transmissive adhesive tape;
filling the enclosed housing with a desired gaseous medium;
testing the hard disk drive;
optionally, re-working the hard disk drive; and
irreversibly hermetically sealing the hard disk drive using through transmission infrared bonding to mechanically couple the base component and the cover component.

* * * * *